United States Patent
Hasegawa et al.

[11] Patent Number: 5,881,043
[45] Date of Patent: Mar. 9, 1999

[54] OPTICAL PICKUP WITH A FIRST DETECTOR TO RECEIVE REFLECTED DATA COMPONENT SIGNAL AND A SECOND DETECTOR TO RECEIVE REFLECTED OTHER COMPONENT SIGNAL

[75] Inventors: Shinya Hasegawa; Motomichi Shibano, both of Kawasaki, Japan

[73] Assignee: Fujitsu Limited, Kawasaki, Japan

[21] Appl. No.: 914,138

[22] Filed: Aug. 19, 1997

[30] Foreign Application Priority Data

Mar. 19, 1997 [JP] Japan .................................. 9-066948

[51] Int. Cl.⁶ ..................................................... G11B 7/08
[52] U.S. Cl. .................. 369/106; 369/44.12; 369/44.14; 369/44.23; 369/112; 369/109; 369/122; 369/103
[58] Field of Search .............................. 369/44.23, 112, 369/106, 110, 103, 44.12, 44.37, 109, 44.14, 122

[56] References Cited

U.S. PATENT DOCUMENTS

| | | | |
|---|---|---|---|
| 5,404,344 | 4/1995 | Imada et al. | 369/44.14 |
| 5,448,407 | 9/1995 | Tzeng et al. | 359/638 |
| 5,453,963 | 9/1995 | Katayama et al. | 369/44.23 |
| 5,644,563 | 7/1997 | Yang | 369/112 |
| 5,708,644 | 1/1998 | Hasegawa | 369/112 |
| 5,717,675 | 2/1998 | Yamamoto | 369/110 |
| 5,737,297 | 4/1998 | Mashiyama et al. | 369/109 |

FOREIGN PATENT DOCUMENTS

| | | |
|---|---|---|
| 0 357 323 A2 | 3/1990 | European Pat. Off. . |
| 62-141653 | 6/1987 | Japan . |
| 4-067452 | 3/1992 | Japan . |
| 4-295648 | 10/1992 | Japan . |
| 5-120755 | 5/1993 | Japan . |
| 7-249242 | 9/1995 | Japan . |
| 7-311989 | 11/1995 | Japan . |
| 8-031036 | 2/1996 | Japan . |

*Primary Examiner*—Tod R. Swann
*Assistant Examiner*—Kim-Kwok Chu
*Attorney, Agent, or Firm*—Armstrong, Westerman, Hattori, McLeland & Naughton

[57] ABSTRACT

An optical pickup irradiates a record surface of an optical storage medium with light and receives the light reflected by the record surface. The reflected light includes a data signal light corresponding to data recorded on the optical storage medium and other light. The optical pickup comprises a light source, a data photo detector, another photo detector, a base, a beam splitter, an introductive optical element, and a lens. The light source emits the light to the record surface. The data photo detector receives the data signal light. The another photo detector receives the other light. On the base, the light source, the data photo detector and the another photo detector are arranged. The beam splitter transmits the light from the light source and separates the reflected light from the optical record medium into the data signal light and the other light. The introductive optical element introduces the data signal light to the data photo detector and the other light to the another photo detector. The lens condenses the light from the light source transmitted through the beam splitter on the optical record medium and introduces the reflected light from the optical record medium to the beam splitter.

11 Claims, 8 Drawing Sheets

FIG. 8

OPTICAL PICKUP WITH A FIRST DETECTOR TO RECEIVE REFLECTED DATA COMPONENT SIGNAL AND A SECOND DETECTOR TO RECEIVE REFLECTED OTHER COMPONENT SIGNAL

BACKGROUND OF THE INVENTION

1. Field of the Invention

The present invention relates to an optical pickup reading data stored in an optical disk and so on.

2. Description of the Related Art

Recently, an electronic apparatus using a semiconductor laser has come into wide use, such as an optical disk apparatus.

For an optical disk apparatus, a semiconductor laser is used as a laser light source to write and read data into/from storage media. An optical head and an optical pickup are general terms of the semiconductor laser and of an optical apparatus which applies a laser light emitted from the semiconductor laser to a spot on a data record surface, separates the light reflected by the data record surface into a focus error signal component, a track error signal component and a data signal component and detects them.

A personal computers in which an optical disk apparatus is implemented have been developed to use a large storage medium such as an optical disk. Thus, since it is desired to make a pocket personal computer compact and to reduce an electric power for the pocket personal computer, it is necessary to make an optical disk apparatus compact and lightweight when the optical disk apparatus is implemented in the personal computer.

Particularly, when the implement space and the weight of the optical pickup increase, a carriage supporting the optical pickup becomes large, therefore, a seek time increases because it takes a lot of time to move the carriage. Thus, it is necessary to reduce the number of parts, to make the implement space small and to make the optical pickup lightweight.

Moreover, in the conventional optical pickup, units for detecting a focus error signal component, a track error signal component and a data signal component are arranged separately. Thus, there are problems that the weight increase in accordance with increase of the number of parts and it is difficult to make the implement space small.

SUMMARY OF THE INVENTION

Accordingly, it is an object of the present invention to solve those problems, to reduce an implement space for an optical pickup in an apparatus writing data into an optical storage medium such as an optical disk and reading data stored in the optical storage medium, and to make the apparatus compact and to reduce the weight of the apparatus.

To solve the above-mentioned problems, the present invention provides an optical pickup as follows.

That is, an optical pickup of the first aspect according to the present invention irradiates a record surface of an optical storage medium with light and receives the light reflected by the record surface. The reflected light includes a data signal component corresponding to data recorded on the optical storage medium and other component. The optical pickup comprises a light source, a first photo detector (PD), a second photo detector (PD), a base, a light separation optical element, an introduction optical element, and a condensing optical element.

The light source emits the light to the record surface of the optical storage medium. The first PD receives the data signal component of the reflected light. The second PD receives the other component. The base is provided with a surface on which the light source, the first PD and the second PD are arranged. The light separation optical element transmits the light from the light source and separates the reflected light from the optical record medium into the data signal component and the other component. The introduction optical element introduces the data signal component to the first PD and the other component to the second PD. The condensing optical element condenses the light from the light source transmitted through the light separation optical element on the optical record medium and introduces the reflected light from the optical record medium to the separation optical element.

The introduction optical element may comprise a diffractive optical element transmitting the light from the light source and diffracting the other component of the reflected light from the optical storage medium so as to separate it into at least two signal components (second aspect).

The introduction optical element may comprise a compensation element compensating the light from the light source from divergent rays to parallel rays, and the separation optical element may make the data signal component incident on the compensation optical element at a predetermined angle of incidence and may transmit the other component (third aspect).

According to the optical pickup of the present invention, the first PD, the second PD and the light source are arranged in the same surface, therefore, it is possible to reduce the implement space and number of parts for the optical pickup. It is also possible to reduce the seek time.

In this optical pickup, it is possible to use a collimating lens or the like as the compensation element. The collimating lens, however, is deigned such as a light introduced vertically is gathered at a predetermined position. Thus, when a light is introduced obliquely, there is a case that aberration occurs and a condensed beam becomes large.

Then, the introduction optical element may comprise an optical member arranged between the first PD and the compensation optical element. The optical member may introduce the reflected light transmitted through the compensation optical element to the first light receiving device (fourth aspect).

For example, the optical member may be adhered to a surface of the first PD device.

The optical member is arranged in this way, whereby it is possible to receive the data signal by the first PD certainly.

The compensation optical element may introduce the data signal component of the reflected light from the optical record medium to the first PD (fifth aspect).

The diffractive optical element may comprise a tracking signal diffraction part diffracting a tracking signal contained in the other component and used for a tracking control to position an optical spot at a predetermined track on the record surface and a focus signal diffraction part diffracting a focus signal contained in the other component and used for a focus control to keep the optical spot on the record surface (sixth aspect).

The second PD) may comprise a tracking signal receiving part for receiving a tracking signal and a focus signal receiving part for receiving a focus signal (seventh aspect).

The optical pickup is structured like this, whereby the tracking signal and the focus signal can be received separately.

The light separation optical elements may comprise a polarizing beam splitter reflecting the data signal component and transmitting the other component (eighth aspect).

The light separation optical element may comprise a polarizing separation element separating the data signal component reflected by the polarizing beam splitter into components which are orthogonal each other (ninth aspect).

In those aspects, it is preferable to arrange the polarizing beam splitter and the polarizing separation member in a manner that each component separated by the polarizing separation member is introduced to the compensation part at a predetermined angle of incident.

The polarizing separation element is arranged between the polarizing beam splitter and the first PD (tenth aspect).

As the polarizing separation element, an uniaxial doubly refracting crystal prism, a polarizing beam splitter or the like may be used. The polarizing separation element may be adhered to a surface of the first PD.

Moreover, the present invention provides a method of irradiating a record surface of an optical storage medium with light and of receiving the light reflected by the record surface. The reflected light includes a data signal component corresponding data recorded on the optical storage medium and other component.

This method comprises a step of emitting a light from a light source arranged on a base to the record surface, a step of compensating the light from the light source from divergent rays to parallel rays, a step of condensing the parallel rays on the record surface, a step of reflecting the light condensed on the record surface, a step of separating the light reflected by the record surface into the data signal component and the other component, and a step of introducing the data signal component to a first receiving part and introducing the other component to a second receiving part, said first receiving part and said second receiving part being arranged on the base.

BRIEF DESCRIPTION OF THE DRAWINGS

Other objects and advantages of the present invention will become apparent during the following discussion conjunction with the accompanying drawings, in which.

DETAILED DESCRIPTION OF THE PREFERRED EMBODIMENTS

Preferred aspects and embodiments of the present invention will now be described with reference to the accompanying drawings.

<First Embodiment>

Figure 1:
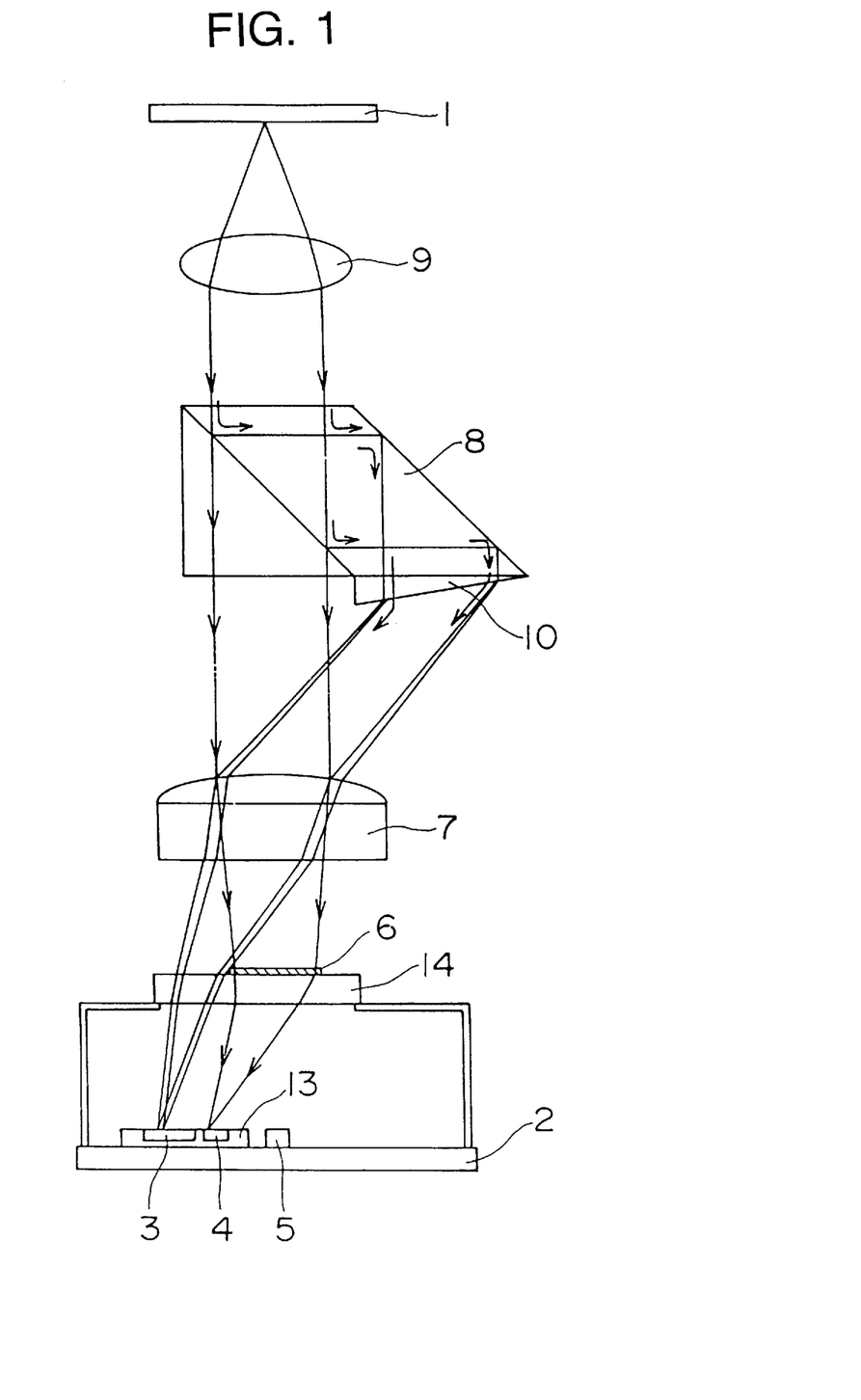
FIG. 1 is a view illustrating an optical pickup according to the first embodiment of the present invention.

FIG. 1 illustrates a whole structure of an optical pickup according to the first embodiment.

In this embodiment, an explanation is given by using a MO (magneto-optical) disk in which data are stored by varying a magnetization direction in a storage magnetization domain formed on a surface of an optical disk, as a sample of optical storage media.

The optical pickup is provided with a stem 2 which is a frame having an opening at the ceiling, and a semiconductor laser 5 and a silicon wafer 13 which are arranged on the bottom of the stem 2.

The semiconductor laser 5 is a sample of a light source, and emits a linearly polarized laser light including only a p-polarized light in this embodiment. The laser light has a mean oscillating wave length of 685 nm and a divergence angle of 12°–15°.

To the silicon wafer 3, a data signal photo detector 3 as a first photo detector and an error signal photo detector 4 as a second photo detector.

Figure 2:
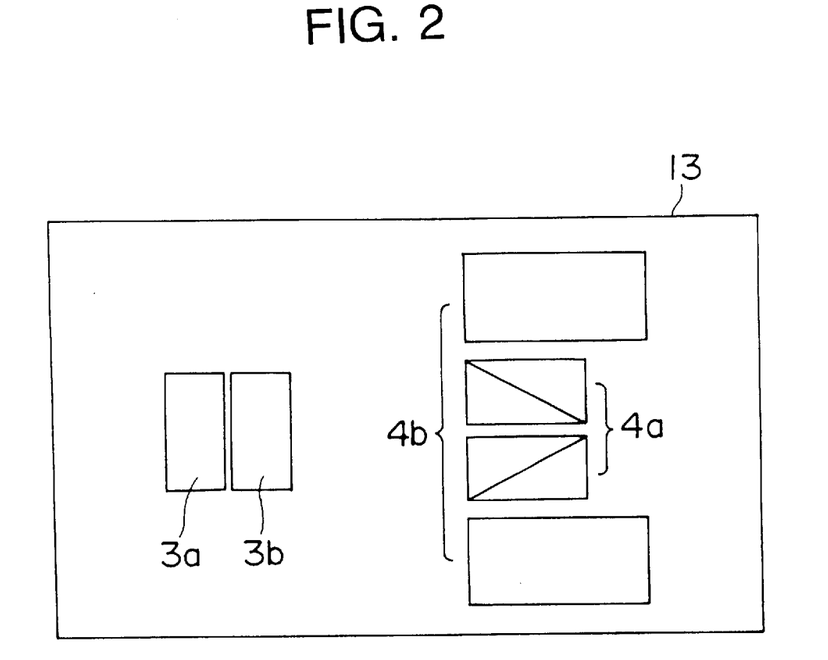
FIG. 2 is a view illustrating an arrangement sample of photo detectors provided on a silicon wafer.

The data signal photo detector 3, as shown in FIG. 2, is provided with a data signal photo detector 3a receiving a p polarizing component of the reflected light from the MO disk 1 and a data signal photo detector 3b receiving a s polarizing component (magneto optical signal component) of the reflected light.

The error signal photo detector 4 is provided with photo detectors for tracking error detection 4b including two photo detectors and for focus error detection 4a including two photo detectors arranged between the two photo detectors for the tracking error detection 4b.

The opening of the stem 2 is covered by a clear glass plate 14. A hologram 6 is fixed to the upper surface of the glass plate 14 in a manner that the center thereof is arranged at the optical axis of the semiconductor laser 5.

The hologram 6, namely, a diffractive optical element transmits the light from the semiconductor laser 5, and diffracts the reflected light from the MO disk 1 so as to condense the reflected light to the error signal photo detector 4.

Figure 3:
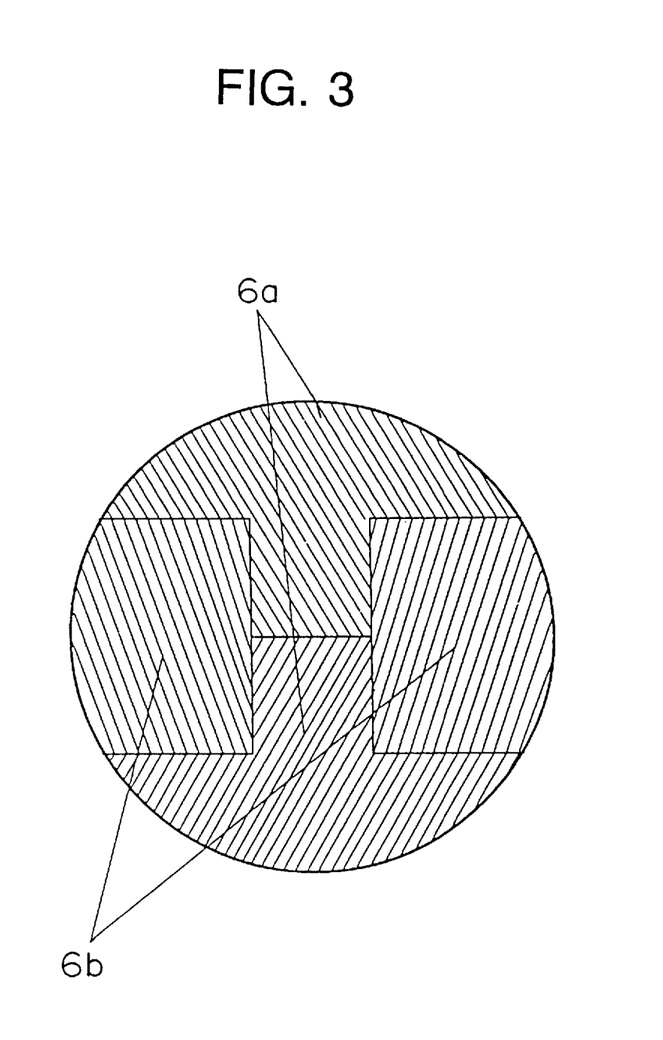
FIG. 3 is a plan view illustrating a structure of a hologram.

The hologram 6, as shown in FIG. 3, is divided into two areas 6a diffracting the tracking signal light and two areas 6b diffracting the tracking signal light. Each of these four areas 6a, 6b has an individual diffraction grating constant and an individual diffraction direction. For example, one of the tracking signal areas 6a diffracts the reflected light so as to condense the reflected light to one of the tacking error photo detector 4b, and the other diffracts and condenses the reflected light to the other tacking error photo detector 4b. Moreover, one of the focus signal areas 6b diffracts the reflected light so as to condense the reflected light to one of the focus error photo detector 4a in the error signal photo detector 4, and the other diffracts and condenses the reflected light to the other focus error photo detector 4a.

The hologram 6 may be produced by the 2P method (using a photo polymer) in which a hologram is formed on a surface of a BK7 glass substrate by photo polymer, or may be produced by etching of a glass substrate or by injection using a resin or glass into metal pattern.

The hologram 6, for example, transmits p polarized light (a source light) emitted from the semiconductor laser 5 at zero-order diffraction efficiency of 70%, and diffracts a focus signal and a tracking signal in a light which a source light is reflected by the MO disk (hereinafter, called a reflected light) at first-order diffraction efficiency of 30% so as to condense the reflected light to the error signal photo detector 4.

The optical pickup is provided with a collimating lens 7, a polarizing beam splitter (PBS) 8 and an objective lens 9.

The collimating lens 7 converts the source light emitted from the semiconductor laser 5 from divergent rays to parallel rays. When the data signal component in the reflected light from the MO disk 1 falls on the collimating lens 7 at a predetermined angle of incidence, this data signal component is condensed by the collimating lens 7 so as to strike the data signal photo detector 3. When the tracking signal component and the focus signal component in the reflected light fall on the collimating lens 7 at right angle, these signal components are transmitted and condensed by the collimating lens 7 so as to strike the hologram 6.

To make the collimating lens 7 lightweight, it is desirable that the collimating lens 7 is manufactured by injection molding of plastic materials.

Then, the polarizing beam splitter (PBS) 8 is an optical element of a doubly refracting crystal, such as an optical element that the transmittance of p polarized light is not less than 85% and the reflectance of s polarized light is not less than 96%.

The PBS 8 transmits the source light (including only p polarized light) passing through the collimating lens 7 not less than 85%. Then, the PBS 8 transmits the p polarized light (similar to the polarizing detection of the source light) in the reflected light from MO disk 1 not less than 85% and reflects the p polarized light not more than 15%. The PBS 8 also reflects the s polarized light (data signal light) in the reflected light about 96%.

Now, as to the light exposed to the record magnetized domain on the record surface of the MO disk 1, the plane of polarization is rotated by Kerr effect, therefore, the reflected light include many p polarized light and not many s polarizing light. Since the PBS 8 reflects p polarized light about 15% and reflects s polarized light about 100%, it is possible to increase the rate of the s polarized light to the p polarized light.

An non-phase-difference reflecting film is coated on the rear surface of the polarizing separation film, so that it is possible to reflect the reflected light falling on the PBS 8 without varying the phase thereof.

A polarizing separation element 10 is arranged at the outgoing surface of the reflected light of the PBS 8. The polarizing separation element 10 separates the data signal light reflected by the PBS 8 into the polarized light (p polarized light of 15% reflected by the PBS 8) similar to the source light and the different polarized light (s polarized light reflected by the PBS 8) from the source light, whereby each of the separated polarized light falls on the collimating lens 7 at a predetermined angle of incidence.

Figure 4:
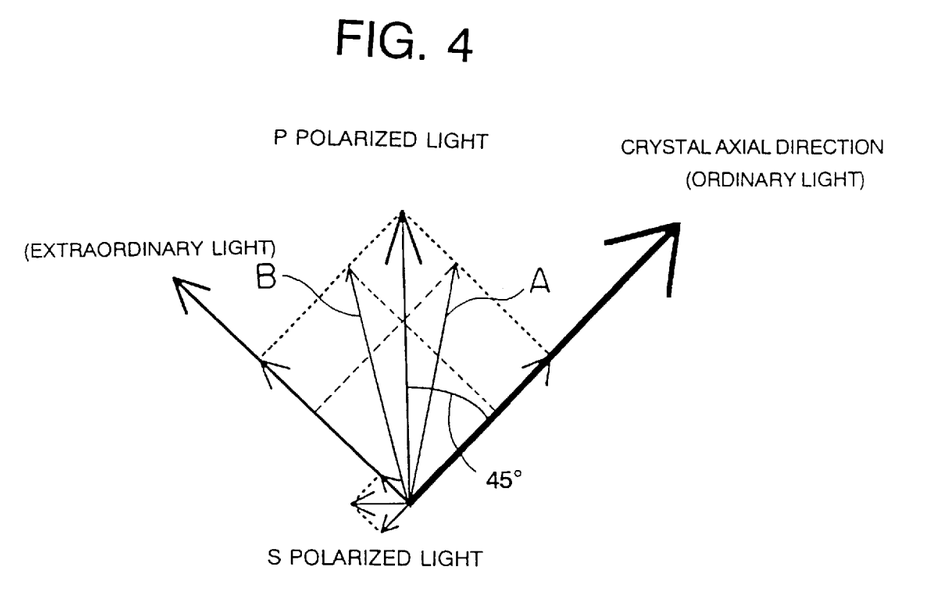
FIG. 4 is a view explaining separation of polarizing components by a polarizing separation element.

As the polarizing separation element 10, it is possible to use an uniaxial doubly refracting crystal prism, a Wollaston prism or the like. In this embodiment, an uniaxial doubly refracting crystal prism is used. Then, as the uniaxial doubly refracting crystal prism, it is possible to use mountain crystal, rutile, calcite, lithium niobate, KDP($KH_2PO_4$), ADP ($KH_4H_2PO_4$) or the like. This embodiment is explained by using lithium niobate which there is relatively a great difference in refractive index between an ordinary light and an extraordinary light. The uniaxial doubly refracting crystal prism, as shown in FIG. 4, is formed in a manner that the crystal axial direction (ordinary light direction) and the polarization axis of p polarized light are intersected at angle of 45°.

In this case, it is possible to make sizes of the ordinary light and the extraordinary light of the incident light (indicated by arrows A, B in FIG. 4) substantially equal rather than that the polarization axis of p polarized light and the crystal axial direction are set in the same direction.

Additionally, the refractive index of the uniaxial doubly refracting crystal prism is set in a manner that, when the reflected light goes out from the PBS 8, the reflected light falls on the collimating lens 7 at a predetermined angle of incidence. The predetermined angle of incidence is set in a manner that the light which comes out from the collimating lens 7 falls on the data signal photo detector 3 and/or an optical member 11 (see FIG. 5) without passing through the hologram 6. The optical member 11 is arranged on the data signal photo detector 3 since aberration is considered.

The objective lens 9 condenses the source light which passes through the PBS 8 on the record surface of the MO disk 1, and corrects the reflected light by the record surface of the MO disk 1 from divergent rays to parallel rays so as to fall on the PBS 8. Anti-Reflecting (AR) coating is applied to surfaces of the hologram 6, the collimating lens 7 and the objective lens 9 to avoid a loss in quantity of light by surface reflection. Particularly, it is preferable to apply coating independent of an angle of incidence to the collimating lens 7 and the hologram 6 when incident lights from oblique directions are taken into consideration.

Hereinafter, an explanation will be given of the operation and the effect of the optical pickup according to this embodiment.

In the optical pickup, the semiconductor laser 5 emits light when data are written into or read from a MO disk.

The source light emitted from the semiconductor laser 5 transmits through the glass plate 14 and the hologram 6 and falls on the collimating lens 7.

The collimating lens 7 corrects the source light from divergent rays to parallel rays and the parallel rays go out. Then, the source light introduced by the collimating lens 7 falls on the PBS 8. The source light includes the p polarized light, therefore, most of the source light falling on the PBS 8 transmits the PBS 8 and falls on the objective lens 9.

The objective lens 9 gathers the falling source light on the record surface of the MO disk 1.

Successively, the source light exposed to the record surface in the MO disk 1 is reflected by the record surface. At that time, as to the light exposed to the record magnetized domain on the record surface, the plane of polarization is slightly rotated by Kerr effect in accordance with the magnetization direction, therefore, the reflected light includes lots of p polarized light and slight s polarized light.

Then, the reflected light falls on the objective lens 9 and is corrected from divergent rays to parallel rays. The reflected light introduced from the objective lens 9 falls on the incident surface of the PBS 8 obliquely. At that time, the PBS 8 transmits the p polarized light of 85% and reflects the remaining p polarized light of 15% and the s polarized light.

The p polarized light transmitting the PBS 8 transmit through the collimating lens 7 and fall on the hologram 6. The p polarized light falling on the tracking signal diffraction areas 6a are diffracted to be gathered at the tracking signal photo detector 4b on the silicon wafer 13. The p polarized light falling on the focus signal diffraction areas 6b are diffracted to be gathered at the focus signal photo detector 4a on the silicon wafer 13.

On the contrary, the reflected light including the p polarized light and the s polarized light are refracted by the uniaxial doubly refracting crystal prism to be the polarizing separation element 10, and fall on the collimating lens 7 at a predetermined angle of incidence.

Then, the collimating lens 7 introduces the p polarized light and the s polarized light to the data signal photo detector 3. At that time, the s polarized light and the p polarized light fall on the data signal photo detector 3 without passing through the hologram 6, therefore, there is no loss in quantity of light by the diffraction of the hologram 6.

According to this embodiment, the semiconductor laser 5, the error signal photo detector 4 and the data signal photo detector 3 are arranged on the same surface, therefore, it is possible to reduce the implement space and the number of parts in the optical pickup.

Thus, it is possible to reduce the weight of the whole optical pickup, to reduce the weight of a carriage loading the optical pickup, and to reduce the driving force to move the carriage. It is also possible to move the carriage speedily and to shorten a seek time.

Figure 5:
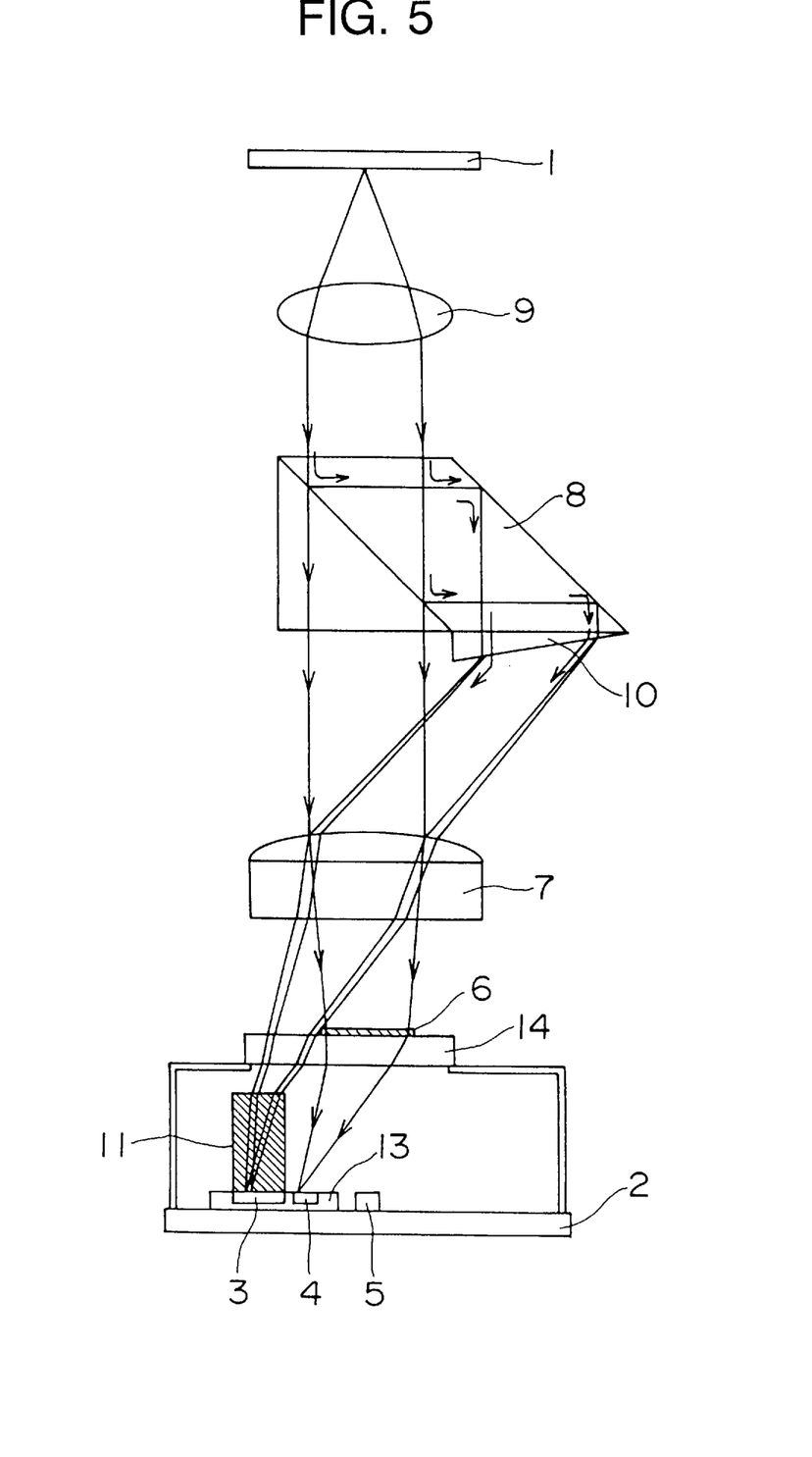
FIG. 5 is a structural view illustrating an optical pickup for aberration correction.

Additionally, aberration occurs in a light falling on the collimating lens 7 while the light goes out from the collimating lens 7, when the angle of incidence becomes large by restriction on an optical system, therefore, it is necessary to shorten the distance between the collimating lens 7 and photo detectors. Thus, as shown in FIG. 5, the optical member 11 of a predetermined refractive index is arranged on the data signal photo detector 3 so as to correct aberrations. In this case, signal light left from the collimating lens 7 are introduced to the optical member 11, and are refracted by the optical member 11 so as to be gathered on the data signal photo detector 3.

<Other Embodiments>

Hereinafter, explanations will be given of other embodiments of the optical pickup according to the present invention. These explanations will be given of structures which are different from the first embodiment.

<Second Embodiment>

Figure 6:
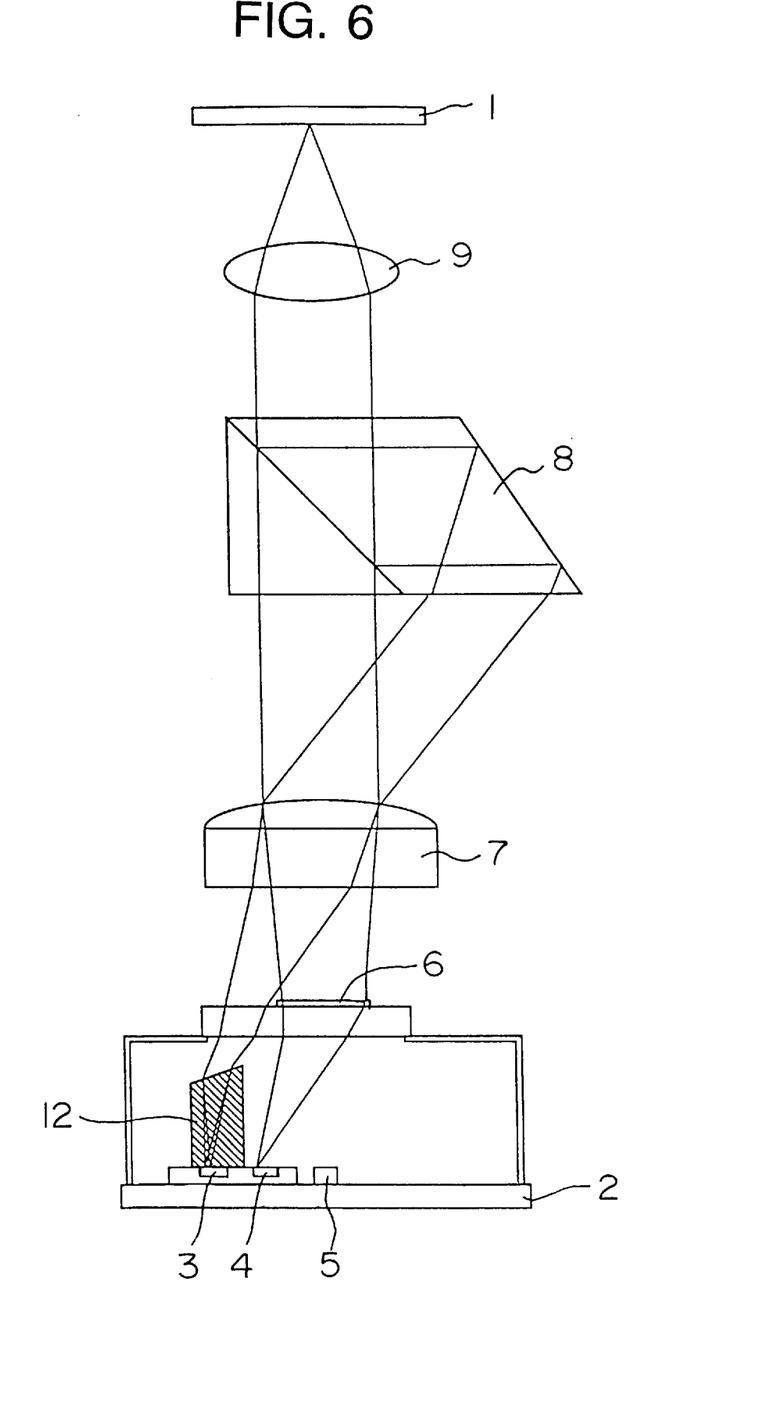
FIG. 6 is a view illustrating an optical pickup of the second embodiment according to the present invention.

FIG. 6 is a view illustrating the second embodiment of the optical pickup. As shown in FIG. 6, no polarizing separation element is attached to the PBS 8, and a polarizing separation element 12 is arranged on the data signal photo detector 3 instead of the optical member 11 in FIG. 5.

As the polarizing separation element 12, it is possible to use a small-size polarizing beam splitter, a laminated polarizing separation element (LPS), an uniaxial doubly refracting crystal prism or the like. In this embodiment, an uniaxial doubly refracting crystal prism that rutile crystal is formed in a prism is used. Additionally, the uniaxial doubly refracting crystal prism is formed in a manner that an incident surface on which the reflected light from the collimating lens 7 falls is inclined at 8° from the horizonal direction and the optical axis is inclined at 45° from the p polarizing axis.

Concerning an optical pickup structured like this, it is unnecessary to attach a polarizing separation element to the PBS 8, therefore, it is possible to reduce the number of parts and the weight in the optical pickup.

<Third Embodiment>

Figure 7:
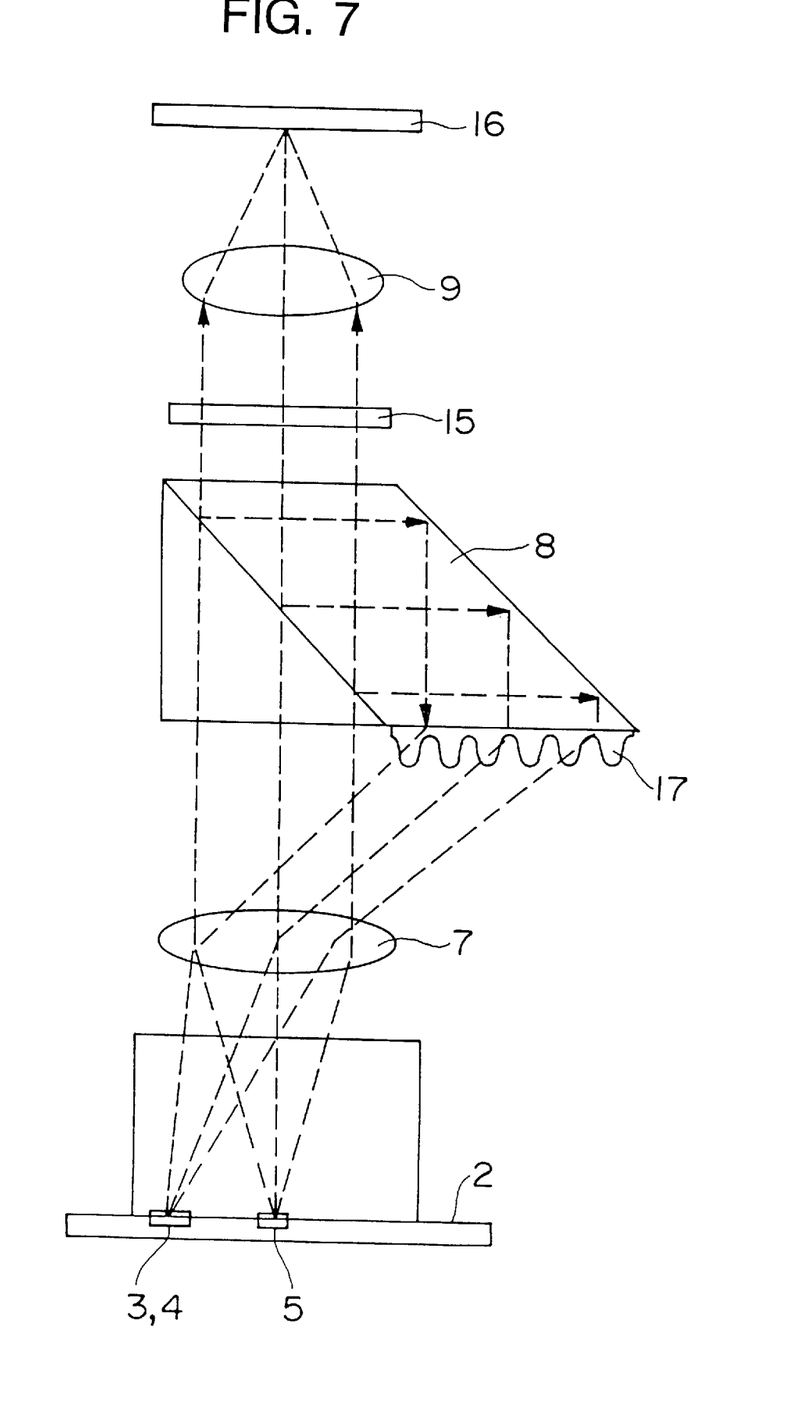
FIG. 7 is a view illustrating an optical pickup of the third embodiment according to the present invention.

FIG. 7 is a view illustrating the third embodiment of an optical pickup. The optical pickup is used for a phase change disk that a phase change film is formed in the disk and data are stored by using a difference of reflectivity between a crystal phase of regular atomic arrangement and an amorphous phase of irregular atomic arrangement. As shown in FIG. 7, no hologram is arranged on the opening of the stem 2, but a ¼λ wave length plate 15 is arranged between the PBS 8 and the objective lens 9 and a hologram 17 is attached to the PBS 8 instead of the polarizing separation element 10. In this case, the source light from the semiconductor laser 5 is introduced to the ¼λ wave length plate 15 through the collimating lens 7 and the PBS 8, and then is converted by the collimating lens 7 from a linearly polarized light to a circularly polarized light.

Then, the source light left from the ¼λ wave length plate 15 is gathered on a record surface of a phase change optical disk 16 by the objective lens 9. At that time, the source light is reflected by the record surface of the phase change optical disk 16 while the polarization direction of the circularly polarized light reverses.

The reflected light is introduced to the ¼λ wave length plate 15 again, and is converted from the circularly polarized light to the linearly polarized light of s polarization. The reflected light of s polarized light is reflected by the polarizing beam splitter 8 and is introduced to the hologram 17.

The hologram 17 diffracts the s polarized light and introduces them to the collimating lens 7 at a predetermined angle of incidence.

The collimating lens 7 gathers the s polarized light from the hologram 17 on the data signal photo detector 3 and the error signal photo detector 4 on the stem 2.

As above described, it is possible for the optical pickup according to the present invention to reduce the implement space and the weight though the optical pickup is used for phase change optical disks.

In the third embodiment, the explanation is given of phase change optical disks, however, the present invention is not limited to those.

<Fourth Embodiment>

Figure 8:
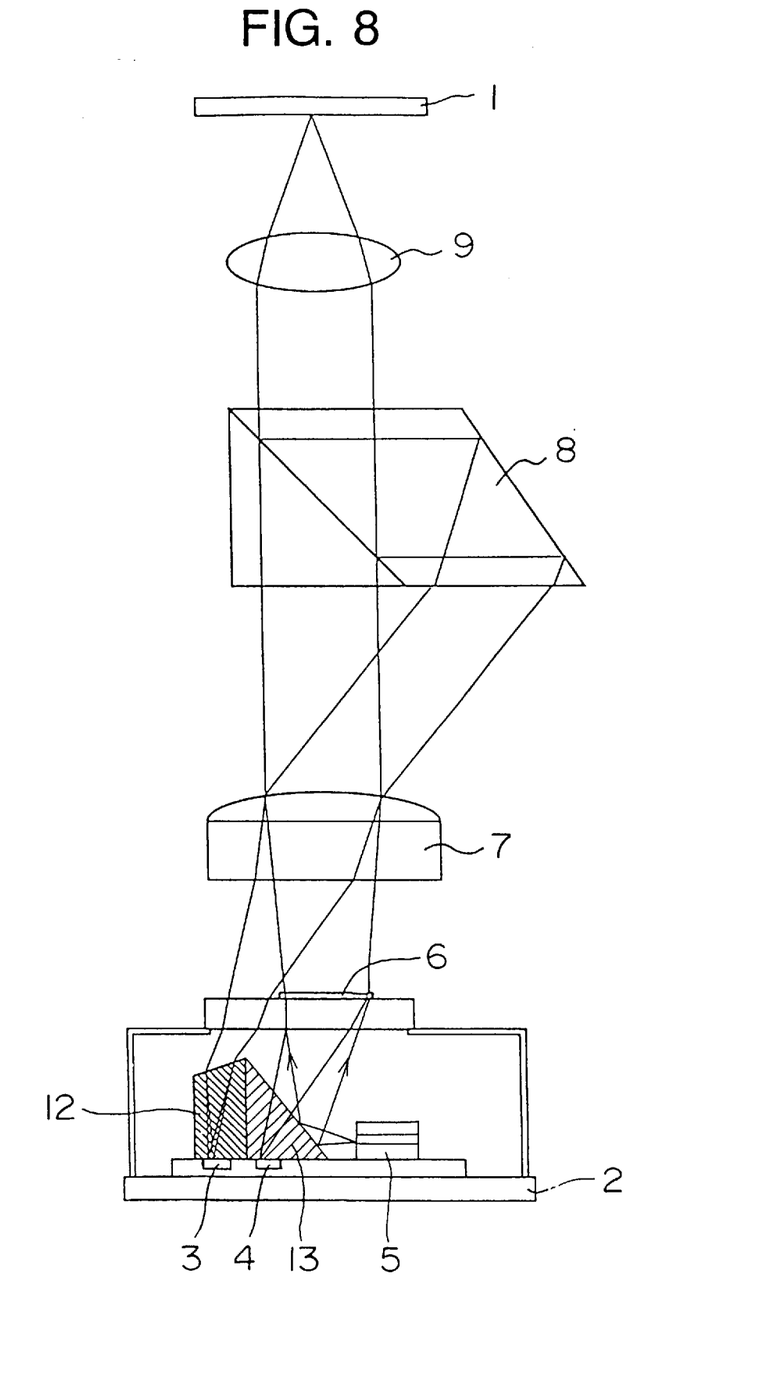
FIG. 8 is a view illustrating an optical pickup of the fourth embodiment according to the present invention.

FIG. 8 is a view illustrating the fourth embodiment of an optical pickup.

As shown in FIG. 8, the semiconductor laser 5 is arranged on a wafer in a manner that the light from the semiconductor laser 5 is introduced in a horizonal direction, and a prism which changes the direction of light from the semiconductor laser 5 into a vertical direction is arranged on the wafer. Additionally, the polarizing separation member 10 may be attached to the PBS 8 in FIG. 8.

According to the present invention, since a light source, a first light receiving device and a second light receiving device are arranged on the same surface, it is possible to reduce the implement space and the number of parts for the optical pickup, therefore, it is possible to reduce the weight of the optical pickup.

This invention being thus described, it will be obvious that same may be varied in various ways. Saturations are not to be regarded as departure from the spirit and scope of the invention, and all such modifications would be obvious for one skilled in the art intended to be included within the scope of the following claims.

What is claimed is:

1. An optical pickup irradiating a record surface of an optical storage medium with light and receiving the light reflected by the record surface, said reflected light composed of a data signal component corresponding to data recorded on the optical storage medium and other component, said optical pickup comprising:

a light source emitting the light to the record surface of the optical storage medium;

a first photo detector receiving the data signal component of the reflected light;

a second photo detector receiving the other component;

a base having a surface on which the light source, the first photo detector and the second photo detector are arranged;

a light separation optical element which transmits the light from the light source and separates the reflected light from the optical storage medium into the data signal component and the other component; and a condensing optical element optically interposed between said base and said light separation optical element condensing the reflected light from the optical storage medium transmitted through the light separation optical element on the first and second photo detectors and introducing the light emitted by the light source to the optical storage medium through the light separation optical element.

2. An optical pickup according to claim 1, further comprising a diffractive optical element transmitting the light from the light source and diffracting the other component of the reflected light from the optical storage medium so as to separate it into at least two signal components.

3. An optical pickup according to the claim 2, wherein said diffractive optical element comprises a tracking signal diffraction part diffracting a tracking signal light contained in the other component and used for a tracking control to position an optical spot at a predetermined track on the record surface and a focus signal diffraction part diffracting a focus signal light contained in the other component and used for a focus control to keep the optical spot on the record surface.

4. An optical pickup according to the claim 3, wherein said second photo detector comprises a tracking signal receiving part for receiving the tracking signal light and a focus signal receiving part for receiving a focus signal light.

5. An optical pickup according to claim 1, wherein said light separation optical element makes the data signal component incident on the condensing optical element at a predetermined angle of incidence and transmits the other component.

6. An optical pickup according to the claim 3, further comprising an optical member arranged between the first photo detector and the condensing optical element, said optical member introducing the reflected light transmitted through the condensing optical element to the first photo detector.

7. An optical pickup according to the claim 5, wherein said condensing optical element introduces the data signal component of the reflected light from the optical storage medium to the first photo detector.

8. An optical pickup according to the claim 1, wherein said light separation optical element comprises a polarizing beam splitter reflecting the data signal light and transmitting the other light.

9. An optical pickup according to the claim 8, wherein said light separation optical element comprises a polarizing separation element separating the data signal light reflected by the polarizing beam splitter into lights which are orthogonal each other.

10. An optical pickup according to the claim 8, wherein said polarizing separation element is arranged between the polarizing beam splitter and the first photo detector.

11. A method of irradiating a record surface of an optical storage medium with light and of receiving the light reflected by the record surface, said reflected light composed of a component of data signal light corresponding data recorded on the optical storage medium and a component of other light, said method comprising:

emitting rays from a light source arranged on a base to the record surface;

converting the rays from the light source from divergent rays to parallel rays;

condensing the parallel rays on the record surface;

reflecting the light condensed on the record surface;

separating the light reflected by the record surface into the data signal light and the other light; and condensing the data signal light to a first photo detector and condensing the other light to a second photo detector, said first photo detector and said second photo detector being arranged on the base.

* * * * *